T. GENSMER AND G. F. LIEBERMAN.
MACHINE FOR EFFECTING ORDERLY DISTRIBUTION OF ARTICLES.
APPLICATION FILED NOV. 11, 1914. RENEWED JUNE 17, 1919.
1,336,778.
Patented Apr. 13, 1920.
3 SHEETS—SHEET 3.
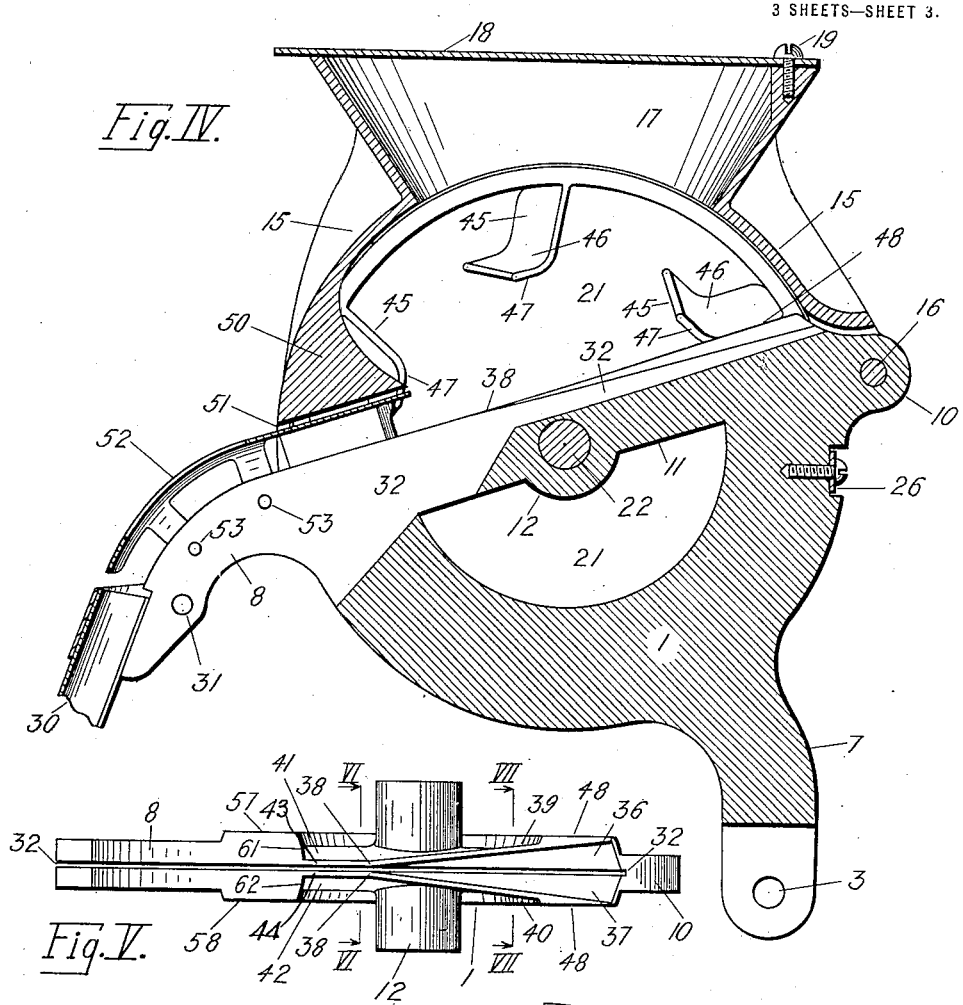
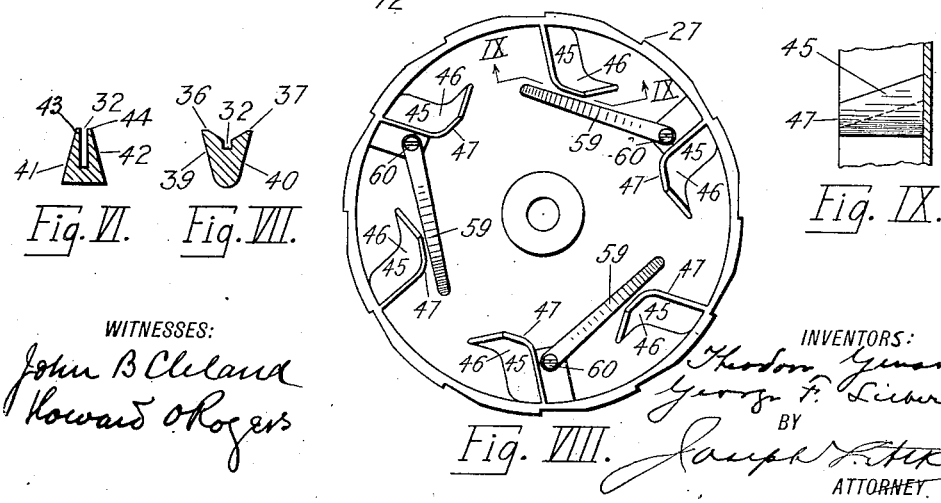

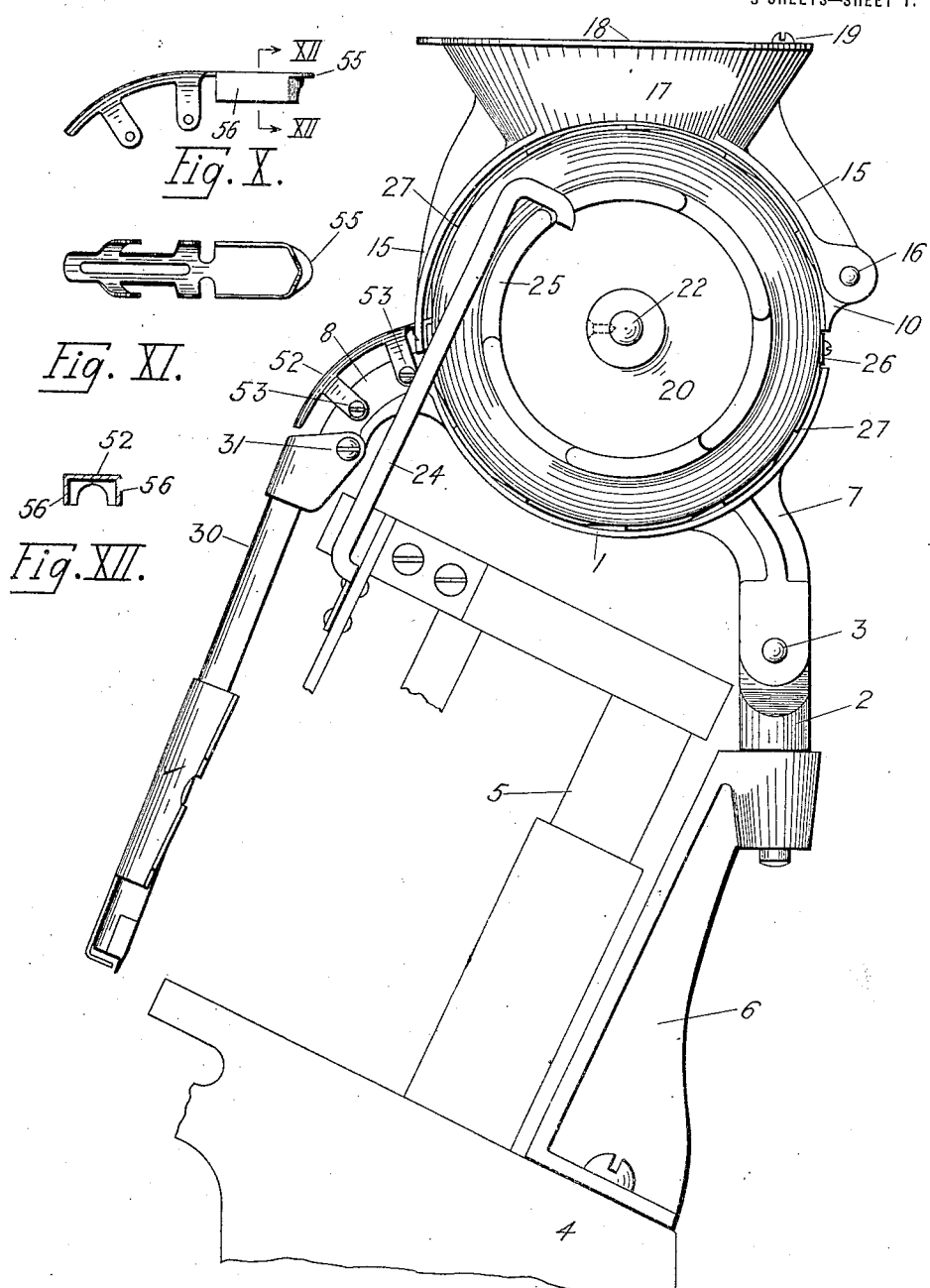

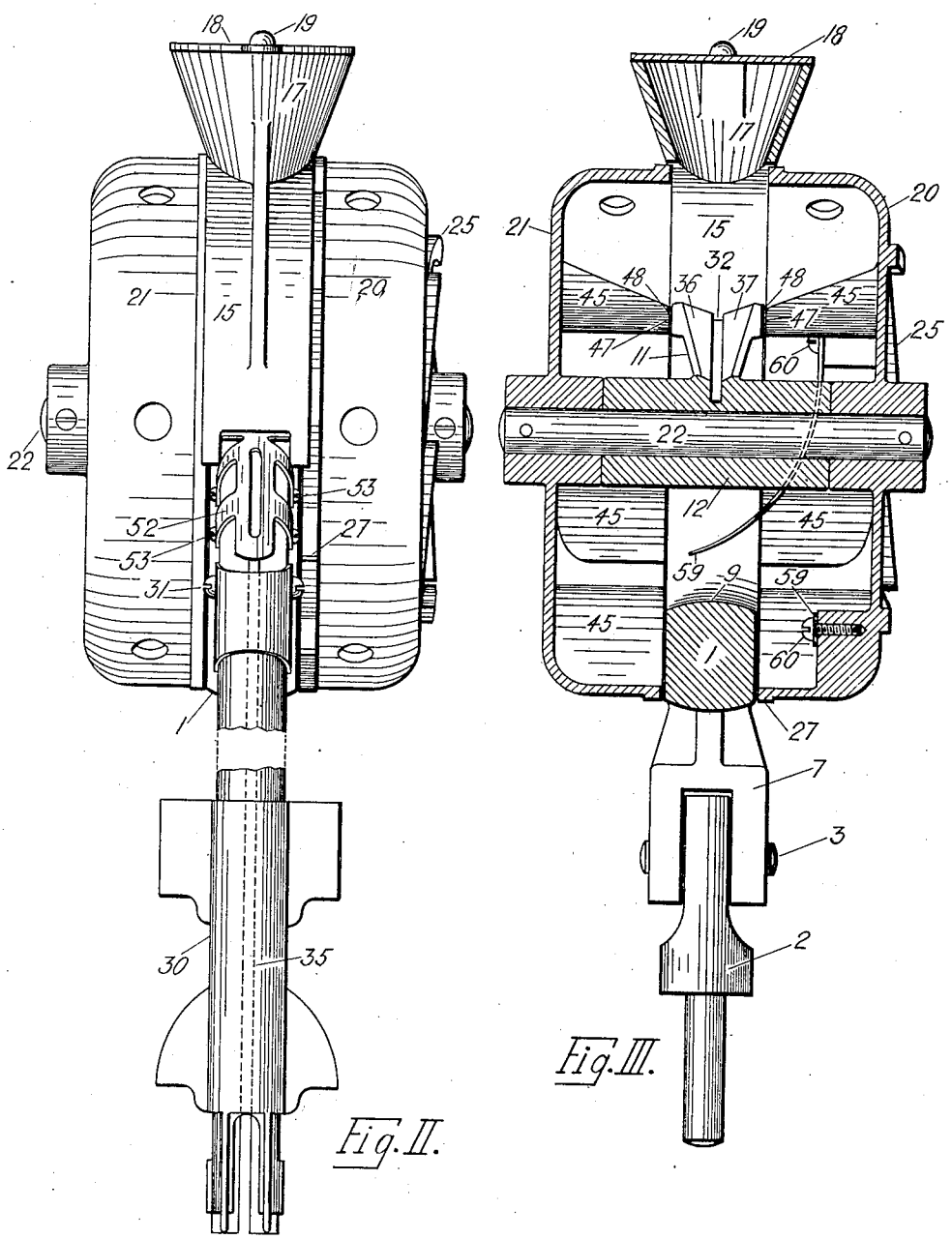

UNITED STATES PATENT OFFICE.

THEODORE GENSMER AND GEORGE F. LIEBERMAN, OF PORTLAND, OREGON, ASSIGNORS TO NU AUTOMATIC BUTTON-ATTACHING MACHINE COMPANY, OF PORTLAND, OREGON, A CORPORATION OF OREGON.

MACHINE FOR EFFECTING ORDERLY DISTRIBUTION OF ARTICLES.

1,336,778.        Specification of Letters Patent.        Patented Apr. 13, 1920.

Application filed November 11, 1914, Serial No. 871,601. Renewed June 17, 1919. Serial No. 304,918.

*To all whom it may concern:*

Be it known that we, THEODORE GENSMER and GEORGE F. LIEBERMAN, each a citizen of the United States of America, residing at Portland, in the county of Multnomah, in the State of Oregon, have invented certain new and useful Machines for Effecting Orderly Distribution of Articles, of which the following is a specification, reference being had to the accompanying drawings.

Our invention relates to machines for automatically assembling and arranging into order individual articles from a disordered collection thereof. It is adapted to handle many varieties of small articles, such for example as nails or tacks, to put them in position to be taken up by a nailing machine, but its special adaptation and the one particularly contemplated in this application is for setting buttons in orderly array preparatory to the feeding of them, one by one, to a button attaching machine.

Machines for a like purpose are sometimes known in the art as "hoppers," but this term besides being regarded as a misnomer, is believed to be too narrow to designate adequately our present invention which should be understood, nevertheless, as comprehending all that the term "hopper" is ordinarily understood to include in the art relating to button attaching machines.

Among the numerous objects of our invention, one of prime importance is to provide means for the continuous and uninterrupted operation of the machine. Clogging of machines heretofore employed has been one of the most serious objections to them in use. By our invention that objection is practically eliminated, and the end is accomplished in a machine of improved simplicity, durability, and economy of manufacture.

What constitutes our invention will be hereinafter specified in detail and succinctly set forth in the appended claims.

In the accompanying drawings which are a part of this specification,

Figure I is a side elevation of the subject matter of our present invention in preferred form of embodiment, shown as attached to a button attaching machine, whereof certain fragmentary details for convenience of reference are shown.

Fig. II is a front elevation of the machine as shown in Fig. I, detached.

Fig. III is a central vertical section of the subject matter of Fig. II, some parts being in elevation.

Fig. IV is a central vertical section of the subject matter of Fig. II, taken at right angles to that view, the delivery chute being partially broken away.

Fig. V is a top plan view of the alining member detached, illustrating the hopper proper and raceway in their present preferred form of embodiment.

Fig. VI is a vertical section as on the line VI—VI of Fig. V.

Fig. VII is a view similar to Fig. VI, taken on line VII—VII of Fig. V.

Fig. VIII is an inside elevation of the driving cheek-bowl of the case of our machine shown upon a slightly reduced scale and detached.

Fig. IX is a detail section on the line IX—IX of Fig. VIII, illustrative of one of the shovel blades of the cheek-bowl.

Fig. X is a side elevation of the raceway hood detached.

Fig. XI is a bottom plan view of the same.

Fig. XII is a section on the line XII—XII of Fig. X.

Referring to the numerals on the drawings, 1 indicates a medial frame-piece which preferably constitutes the support for the machine being itself supported as upon an upright 2 to which it is preferably hinged as indicated at 3. The upright 2 preferably constitutes a swivel support for the frame-piece 1 upon the frame 4 of a button attaching machine, whereof a fragment, in one form of embodiment, is shown in Fig. I. It suffices, in respect to the button attaching machine, to specify that, in addition to its frame 4, it is provided with a relatively reciprocatory member 5, also illustrated in Fig. I. An intermediate bracket 6 is shown as carrying the support 2 upon the frame 4.

The frame-piece 1 is shown as having a curvilinear outside contour, constituting a part of a narrow cylinder having on one side a leg 7 and on the other a downwardly curved projection 8, which is the shape that we at present prefer to give it. It is also, preferably, of a convex shape in cross section on the inside as shown at 9. 10 indicates a lug that is preferably disposed in diametrical opposition to the projection 8, and between those members preferably extends an alining member or bridge 11, that is so disposed in order to carry a journal bearing 12, which in the form of embodiment illustrated, is centrally disposed with respect to the frame-piece 1 and its complementary parts, whereof the chief one is a head-piece 15. The head-piece 15 preferably is hinged to the lug 10, as indicated at 16, so that, when closed, it completes the generally cylindrical effect of the frame-piece 1, an effect which is offset by a flared mouth-piece 17 preferably provided upon the head-piece. A laterally swinging plate 18, pivoted as upon a screw 19, may serve as a cover to open and close at will the mouth-piece 17, which, as will hereinafter appear, constitutes the feed aperture of the machine.

The frame-piece 1 is combined, preferably, with cheek-bowls 20 and 21 to constitute what may be called the case of our machine. The cheek-bowls, so called because, in the form of embodiment of our invention now preferred, they inclose the opposite sides of the frame-piece 1 and in part its complementary head-piece 15, find means of free intercommunication across the frame-piece 1 both above and below the bridge 11 thereof.

The cheek-bowls, are, for the most part, substantially identical in outward form and contour, except that the one, 20, is a driving and the other, 21, is a driven member. The distinction is purely a relative one having reference to the fact that the part 21 is adapted to derive motion from the part 20. Both are mounted upon and secured to a shaft 22 which, working in the bearing 12 in the bridge, unites them together and operatively mounts them upon the frame piece 1. The cheek-bowl 20 is itself, nevertheless intermittently actuated through relative movement, as often as it occurs in the operation of the button attaching machine, between the parts 4 and 5, by engagement between a yielding hook 24, connected with the part 5 (see Fig. I) and operatively disposed in respect to the teeth of an annular ratchet 25 wherewith the cheek-bowl 20 is provided in contradistinction from the cheek-bowl 21. The step by step rotation of both bowls, without backward slip, is insured by engagement between a clip 26, secured upon the frame-piece 1, with the ratchet teeth 27 disposed in order corresponding to that of the teeth of the ratchet 25 about the periphery of the bowl 20.

The office of the alining member or bridge 11 is to receive articles, (specifically buttons) from the mass thereof confined within the case, consisting of the members 1, 15, 20 and 21, and to deliver them without interruption and in desired order to a chute 30, that is united, preferably by a hinge pintle 31, to the projection 8. To the end specified the bridge is preferably disposed midwise of the case and is likewise provided with a longitudinally disposed groove or slot 32 which extends from one side of the frame-piece 1 to the outer end of the projection 8, merging toward the latter from the groove form into a through and through slot or kerf. The function of the groove or slot 32 is to accommodate and thereby to arrange in order a projecting member of the article operated upon by the machine, or, specifically, the eyelet or shank of a button. The depth of the groove should be sufficient to receive the full length of said projecting member, the provision of the slot form thereof being made to afford clearance, if need be, of any trash which may find its way into the interior of the case.

The groove 32 at the end of the projection 8 registers with a slot 35 that extends from top to bottom of the chute 30, whereof it is enough to specify in the present application that it is adapted to operatively present the buttons supplied to it to the button attaching machine, represented by the parts 4 and 5.

The bridge 11 is normally inclined toward the discharge end of its groove 32, so that buttons or other articles tend by gravity to slide down upon it.

It being, as has been specified, the function of the grooved bridge 11 to accommodate, in desired order of arrangement articles supplied to it, provision is made for clearing it of any aggregation of articles in excess of an adequate supply and particularly of such as might tend to clog and so interrupt the operation of the machine. Accordingly we prefer to provide above the groove 32 a hopper proper, comprising side walls 36 and 37 whose inner faces are divergent toward that end of the groove adjacent to the lug 10. Said inner faces are inclined toward each other above the groove 32 into which they merge at their lower ends as indicated at 38. The outer faces 39 and 40 of the walls 36 and 37 are preferably slightly undercut for the most part as shown in Fig. VII, while the outer faces 41 and 42 fall away sharply from the edges 43 and 44 which extending, in effect, from the point 38 to the upper end of the chute 30 constitute that which may be designated a raceway. By reason of the presence of the outer faces 39 and 40 the hopper proper tends to throw back into the interior of the case any button that may lodge on the outside of it, while the disposition of the inner faces of the walls 36 and 37 tends to set the button within the hopper proper into line therein each with its eye or shank properly disposed within the groove 32, ready to slide down the raceway into the chute 30.

The intermittent rotation of the cheek-bowls 20 and 21 heretofore referred to is designed to effect discharge of buttons or other articles as the use of the machine may require from the interior of the case into the hopper proper, and we therefor provide within each cheek-bowl a series of lifters or shovels 45 each in turn disposed and adapted to discharge its load into the broad end of the hopper proper. Each shovel is preferably cast or otherwise formed integrally with its bowl and its rim. Each is preferably trough shaped as indicated at 46 and is preferably provided with a flush edge 47 which works shearwise against a face 48 provided to correspond with it on the respective walls 36 and 37 of the hopper proper (see Fig. III). The shearwise relationship referred to as well as the correlative contours and disposition of the parts, as illustrated, is designed and adapted to prevent the catching of button shanks or the like between coacting members during and in consequence of the operation of the machine. To the like end, we provide upon the overhanging end of the head-piece 15 an inward projection 50 against which the edges 47 of the shovels 45 work as they do against the faces 48 of the hopper proper. Also under the projection 50 a recess 51 is provided for the accommodation of a skeleton hood 52 that is detachably secured to and above the projection 8 as by screws 53. The inner end of the hood 52 is preferably inclined or curved as shown at 55 (see Fig. X) and is protected by side flanges 56 each terminating preferably in inturned ends. (See Fig. XI).

The object of the construction described, in respect to contour and relationship, being to effect a snubbing action between the moving parts which will tend to shove aside a button or other article instead of catching and holding it, we prefer also, for like reason, to provide shear faces 57 and 58 at the lower end of the bridge for the edges 47 of the shovel to work against, and also to provide buffer-faces 61 and 62 at the lower end of the faces 41 and 42.

The provision made in the contour and relationship of parts will suffice for the most part to accomplish the end for which they are contrived, namely, to insure the uninterrupted operation of the machine, but contrariwise it occasionally happens that the desired regularity of the single line of buttons or articles within the groove 32 is broken by a misplaced individual.

We have discovered that the employment of brushes 59 to sweep across the top of the bridge 11 at points approximate to the path of movement of the free ends of the shovels 45 may be relied upon to keep the line of buttons in order and thereby to prevent interruption of the operation of the machine. The brushes which we employ for the purpose consist, preferably, of curved strips of spring metal secured, respectively, to the cheek-bowl 20 as by screws 60. They are, by preference, curved so as to present on their down stroke a convex surface toward the bridge 11, and, likewise, are disposed obliquely to its longitudinal axis so as to make a sweeping stroke in every instance toward the central portion of the case, toward which any article which they may dislodge from the bridge 11 should be projected. Such brushes might be used on both cheek-bowls but it is at present deemed sufficient to use them on one only as above set forth.

In operation the case is supplied through the mouth-piece 17 with a supply of articles, say buttons, which may be as many as the case will conveniently hold without crowding, the cover 18 being alternately opened and closed for admitting and securing the supply of buttons. Thereafter the operation of gathering the buttons into the hopper proper and delivering them in desired order into the chute 30 is entirely automatic, and is accomplished as follows: The buttons gravitate toward the bottom of the case where the contour 9 of the frame-piece 1 precipitates them into one or the other of the cheek-bowls 20—21. There they are caught by shovels 45 which lift them, through the step by step movement of the bowls, until the shovels of the opposite bowls successively pass above the walls 36 and 37, respectively. As each shovel clears the upper edge of the one or the other of said walls, its complement of buttons is discharged by aid of gravity toward the hopper proper whose broad end lies ready to receive the same. The inclined faces of the hopper proper tend to drop all the buttons with sliding motion toward the lower end of the bridge. In such movement some of the buttons will be ejected from the hopper back into the interior of the case where they will, in due course, be received again into a shovel 45 to be again discharged into the hopper. With each discharge of a shovel into the hopper, one or more and usually several buttons will find correct position with its eye or shank properly entered into the groove 32. Thereupon it begins its travel with certainty down the raceway and into the chute 30, from which the buttons are extracted one by one through the operation of the parts 4 and 5 of the button attaching machine. It follows that one button supplied to the chute 30 from each shovel as it is elevated above the hopper proper will supply, twice over, any possible demand upon the button supply in the chute. Consequently it remains only to provide against the clogging of the machine, in order to insure its practically continuous and uninterrupted operation. The contour and relationship of the principal operative elements leave, as has been specified, little to be provided for in that direction, but that little is amply taken care of in the provision of the brushes 59. They sweep the hopper proper and the raceway clear of any buttons except those which follow in orderly succession in a single line, those being held thereto by their lying flat face down against the edges of the raceway and by engagement of the walls of the groove 32 with their respective shanks.

If by accident the machine should be clogged by intrusion of any foreign substance, such as trash, it is a simple matter to lift the head-piece 15 and thereby gain access to the interior of the case, although the raceway with its slot is directly exposed to inspection and clearance through openings provided in the hood 52.

It may, further, be observed that by the provision of the pintle 31, the chute 30 may be removed conveniently whereby different chutes having capacity for buttons of different sizes may be substituted one for another at will.

What we claim is:

1. In a machine for the purpose described, the combination with a medial frame-piece and relatively movable cheek-bowls upon opposite sides of said frame piece constituting therewith a case, of an alining member extending into the space between the cheek-bowls adapted to make orderly alinement and discharge of articles supplied to it through the relative movement of the frame-piece and cheek-bowls.

2. In a machine for the purpose described, the combination with a frame-piece, a head-piece hinged thereto and an alining member, of cheek-bowls carried on opposite sides of the frame-piece and adapted by relative motion between them and the alining member to supply the latter with articles for alinement.

3. In a machine for the purpose described, the combination with a case comprehending a structurally independent frame-piece provided on one side with a support and on the other with a grooved projection constituting a continuation of an alining member provided within the case, and a rotatable cheek bowl coöperating therewith, of a movable chute operatively attached to said projection.

4. In a machine for the purpose described, the combination with a case comprehending a structurally independent frame-piece provided on one side with a pivotal support, and on the other with a grooved projection constituting a continuation of an alining member provided within the case, and a cheek bowl rotatably coöperating therewith, of a movable chute operatively attached to said projection.

5. In a machine for the purpose described, the combination with a case comprehending a structurally independent frame-piece provided on one side with a support and on the other with a grooved projection constituting a continuation of an alining member provided within the case, a cheek bowl rotatably coöperating therewith, and a head-piece pivoted to the frame-piece, of a movable chute operatively attached to said projection.

6. In a machine for the purpose described, the combination with a case comprehending a frame-piece provided on one side with a support and on the other with a grooved projection constituting a continuation of an alining member provided within the case, of a movable chute operatively attached to said projection, and a hood secured to said projection.

7. In a machine for the purpose described, the combination with a case comprehending a frame-piece provided on one side with a support and on the other with a grooved projection constituting a continuation of an alining member provided within the case, of a movable chute operatively attached to said projection, and a hood secured to said projection, said hood being provided within the case with inturned flanges upon its opposite sides.

8. In a machine for the purpose described, a unitary structure comprising at one end a race way, and narrow tapering side walls projecting a short distance therefrom in parallel relation, said side walls then diverging to form a hopper for the reception of the articles to be supplied to the race way.

9. In a machine for the purpose described, the combination with a case comprising a frame-piece, and a relatively movable member constituting therewith a case, of an alining member provided at opposite ends with faces within the case against which shovels provided upon said movable member coact shearwise, and a head-piece hinged to the frame-piece.

10. In a machine for the purpose described, the combination with a case comprising a frame-piece, and a relatively movable member, of an alining member provided at opposite ends with faces within the case against which shovels provided upon said movable member coact shearwise, and a head-piece hinged to the frame-piece, said head-piece having an end overhanging the alining member against which also the shovels work shearwise.

11. In a machine for the purpose described, the combination with a case comprising a medial frame-piece and cheek-bowls, provided with lifters, united together and carried upon opposite sides thereof, of an alining member, means for imparting step by step motion to said bowls, a ratchet upon the periphery of one bowl and a clip engaging therewith on the frame-piece.

12. In a machine for the purpose described, the combination with a case comprising a frame-piece and movable cheek-bowls, and an alining member adapted to receive a supply of articles to be alined from the movement of said cheek-bowls, of a frame, a reciprocatory member, a movable support for said frame-piece upon said frame, operative means connecting said reciprocatory member and cheek-bowls, and a chute hinged in operative relationship to the alining member.

13. In a machine for the purpose described, a case comprising a rotative member, an alining member extending diametrically thereof, and a brush upon the rotative case member adapted through movement thereof to sweep lengthwise of the alining member to remove disalined articles therefrom.

14. In a machine for the purpose described, a case comprising a movable member, an alining member extending diametrically thereof, and a brush upon the movable case member adapted to sweep lengthwise of the alining member to remove disalined articles therefrom and carry the same toward the central portion of the case.

15. In a machine for the purpose described, the combination with an alining member of rotatable case members on opposite sides thereof and provided with lifters, said rotatable members being movable transversely of and in operative relationship to the alining member.

16. In a machine for the purpose described, the combination with an alining member having a horizontally extending axis, of a revoluble member adapted to supply articles thereto, said alining member extending transversely and diametrically of the revoluble member, and brushes upon the latter adapted to sweep the former.

17. In a machine for the purpose described, the combination with an alining member having a horizontally extending axis, of a revoluble member adapted to supply articles thereto, said alining member extending transversely and diametrically of the revoluble member, and brushes upon the latter adapted to sweep the former near opposite ends thereof.

18. In a machine for the purpose described, the combination with a rotatable case, of an alining member operatively disposed midwise of the case and extending into the same, said case having means thereon operative to supply articles to said member from opposite sides thereof.

In testimony whereof we have hereunto set our hands in the presence of two subscribing witnesses.

THEODORE GENSMER.
GEORGE F. LIEBERMAN.

Witnesses:
JOHN B. CLELAND,
EARL J. CLELAND.